United States Patent
Ramakrishnan et al.

(10) Patent No.: US 12,489,475 B2
(45) Date of Patent: Dec. 2, 2025

(54) SYSTEMS AND METHODS TO REDUCE INTERFERENCE IN A RADIO FREQUENCY DEVICE

(71) Applicant: Apple Inc., Cupertino, CA (US)

(72) Inventors: Vijaykrishnan Ramakrishnan, Santa Clara, CA (US); Sathish Shanbhag Kota, San Jose, CA (US); Vijay Kumar Ramamurthi, Fremont, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 17/947,674

(22) Filed: Sep. 19, 2022

(65) Prior Publication Data

US 2023/0089050 A1    Mar. 23, 2023

Related U.S. Application Data

(63) Continuation of application No. 17/880,364, filed on Aug. 3, 2022.

(60) Provisional application No. 63/246,732, filed on Sep. 21, 2021.

(51) Int. Cl.
  *H04B 1/04*    (2006.01)
  *H04B 1/50*    (2006.01)

(52) U.S. Cl.
  CPC ............. *H04B 1/0475* (2013.01); *H04B 1/50* (2013.01)

(58) Field of Classification Search
  CPC .... H04B 7/0617; H04B 1/69; H04B 1/71635; H04B 1/71637; H04B 1/719; H04B 7/0626; H04B 1/406; H04B 1/525; H04B 1/126; H04B 1/18; H04B 1/3838; H04B 17/21; H04B 17/24; H04B 17/328; H04B 7/0417; H04B 7/0469; H04B 7/0478; H04B 7/0479; H04B 7/0634; H04B 7/0639; H04B 1/0475
  USPC .......................................................... 455/79
  See application file for complete search history.

(56) References Cited

U.S. PATENT DOCUMENTS

| | | | |
|---|---|---|---|
| 6,625,433 B1 * | 9/2003 | Poirier | H03G 3/3068 455/253.2 |
| 6,721,368 B1 | 4/2004 | Younis et al. | |
| 9,031,515 B2 | 5/2015 | Mikhemar | |
| 9,350,465 B2 | 5/2016 | Chen | |

(Continued)

FOREIGN PATENT DOCUMENTS

| | | |
|---|---|---|
| CN | 101557206 A | 10/2009 |
| CN | 101848004 A | 9/2010 |

(Continued)

*Primary Examiner* — Ajibola A Akinyemi
(74) *Attorney, Agent, or Firm* — FLETCHER YODER PC

(57) ABSTRACT

A transmitter of an electronic device may include one or more intermediate frequency stage circuitries. Processing circuitry may select one or more intermediate frequency stage circuitries of the transmitter that output one or more intermediate frequency signals that cause interference with a signal received by a receiver of the electronic device. The processing circuitry may adjust settings of the one or more intermediate frequency stage circuitries to reduce interference with the signal received by the receiver and store the settings. Subsequently, the processing circuitry may receive an indication of an operational mode of the receiver and apply the settings to the one or more intermediate frequency stage circuitries based on the indication.

20 Claims, 6 Drawing Sheets

(56) References Cited

U.S. PATENT DOCUMENTS

| | | |
|---|---|---|
| 9,614,562 B2 | 4/2017 | Demay |
| 10,187,807 B2 | 1/2019 | Li |
| 10,219,167 B2 | 2/2019 | Li |
| 10,542,584 B2 | 1/2020 | Gopal |
| 11,184,867 B2 | 11/2021 | O'Shea |
| 2003/0152163 A1 | 8/2003 | Khorram et al. |
| 2010/0136927 A1 | 6/2010 | Rofougaran |
| 2014/0206296 A1 | 7/2014 | Chakraborty et al. |
| 2021/0092694 A1 | 3/2021 | Yang |
| 2021/0126661 A1 | 4/2021 | Galeev et al. |
| 2021/0250775 A1* | 8/2021 | Hardin ................ H04W 52/367 |

FOREIGN PATENT DOCUMENTS

| | | |
|---|---|---|
| CN | 104919712 A | 9/2015 |
| CN | 112204892 A | 1/2021 |

* cited by examiner

SYSTEMS AND METHODS TO REDUCE INTERFERENCE IN A RADIO FREQUENCY DEVICE

CROSS-REFERENCE TO RELATED APPLICATIONS

This application is a continuation of U.S. application Ser. No. 17/880,364, filed Aug. 3, 2022, entitled "SYSTEMS AND METHODS TO REDUCE INTERFERENCE IN A RADIO FREQUENCY DEVICE," which claims priority to U.S. Provisional Application No. 63/246,732, filed Sep. 21, 2021, entitled "SYSTEMS AND METHODS TO REDUCE INTERFERENCE IN A RADIO FREQUENCY DEVICE," each of which is incorporated by reference in its entirety for all purposes.

BACKGROUND

The present embodiments relate to wireless communication devices, and more specifically, to wireless communication devices having multiple transceivers (e.g., multi-radio wireless communication devices).

A wireless communication device may include a transmitter that transmits a radio frequency signal. To do so, the transmitter may pass a baseband signal through one or more intermediate frequency stages to up-convert the baseband signal to the radio frequency. However, the one or more intermediate frequency stages may generate noise that interferes with a receiver of the wireless communication device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include selecting one or more intermediate frequency stage circuitries of a transmitter of an electronic device that output one or more intermediate frequency signals that cause interference with a signal received by a receiver of the electronic device. The method may further include adjusting one or more operating characteristics of the one or more intermediate frequency stage circuitries based at least upon one or more settings to reduce interference with the signal received by the receiver. The method may further include storing the one or more settings to be applied to the one or more intermediate frequency stage circuitries in response to determining that the receiver is operational.

In another embodiment, an electronic device may include a transceiver comprising at least one transmitter and a one or more receivers, where the transmitter may include one or more intermediate frequency stage circuitries. The electronic device may additionally include processing circuitry. The processing circuitry may be configured to receive an indication of a plurality of operational modes of the plurality of receivers. The processing circuitry may be configured to apply settings to the one or more intermediate frequency stage circuitries based on the indication and operate the transmitter based on the settings applied to the one or more intermediate frequency stage circuitries.

In yet another embodiment, one or more tangible, non-transitory, computer-readable media storing instructions executable by one or more processors of an electronic device, wherein the instructions cause the one or more processors to receive a first set of settings of at least a first intermediate frequency stage circuitry and a second intermediate frequency stage circuitry of a transmitter of the electronic device applicable when a receiver of the electronic device is in a first operational mode, the first set of settings comprising causing the first intermediate frequency stage circuitry to have a first gain level and a second intermediate frequency stage circuitry of the plurality of frequency stage circuitries to have a second gain level. The tangible, non-transitory, computer-readable media may further cause the one or more processors to receive a second set of settings of the plurality of frequency stage circuitries of the transmitter of the electronic device applicable when the receiver of the electronic device is in a second operational mode, the second set of settings comprising a first adjustment to the first gain level of the first intermediate frequency stage circuitry and a second adjustment to the second gain level of the second intermediate frequency stage circuitry that at least partially compensates for the first adjustment. The tangible, non-transitory, computer-readable media may further cause the one or more processors to operate the transmitter using the first set of settings based on the receiver of the electronic device being in the first operational mode and operate the transmitter using the second set of settings based on the receiver of the electronic device being in the second operational mode.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
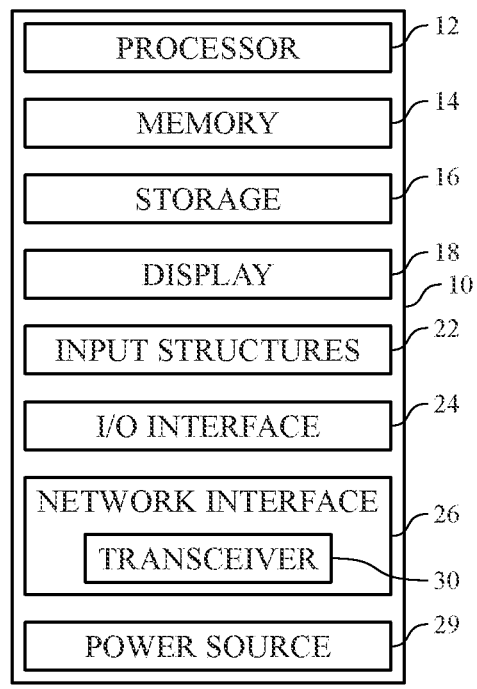
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to reducing noise output by a transceiver in a wireless communication device to reduce interference between one or more intermediate frequency stage circuitries of the transceiver and one or more receivers in the wireless communication device. The wireless communication device may operate over any suitable radio frequency, such as the millimeter wave (mmW) frequency range (e.g., 24.25-300 gigahertz (GHz)). To communicate on the mmW frequency range, the wireless communication device may include one or more transceivers with one or more transmitters that are implemented using one or more stages of up-conversion. The transmitter may use up-conversion when an output frequency is increased compared to an input frequency of an input signal. The input frequency may include a baseband frequency and the output frequency may include a radio frequency. The transmitter may implement up-conversion by using the one or more intermediate frequency stage circuitries, where each intermediate frequency stage circuitry may include a mixer, an amplifier, and/or a filter to convert a respective input frequency of a respective input signal to a respective higher output frequency.

However, the one or more intermediate frequency stage circuitries of the transmitter may operate on the same frequencies or similar frequencies (e.g., within a threshold frequency range) or cause spurious emissions of the same frequencies or similar frequencies as one or more receivers in the mobile communication device. This may lead to interference with the one or more receivers and impair functionality of the one or more receivers. To prevent this interference, hardware solutions may include inserting additional filters in the mobile communication device and/or inserting shielding to shield the one or more receivers from noise. However, these hardware solutions add additional costs and complexity to the mobile communication device.

The presently disclosed embodiments may reduce interference to the one or more receivers of the wireless communication device without increasing hardware cost or complexity of the mobile communication device. In some embodiments, reducing a gain value of one or more intermediate frequency stage circuitries may reduce interference with the one or more receivers. Additionally, improving a linearity of one or more intermediate frequency stage circuitries may reduce the spurious noise spectrum at the output of each intermediate frequency stage circuitry, where the linearity may refer to an ability of respective amplification circuitry of respective intermediate frequency stage circuitry to produce an output signal that resembles the input signal. Amplification circuitry with a smaller range of linearity have a greater likelihood of producing spurious emissions that may affect the one or more receivers. In some cases, these embodiments may be implemented concurrently. The gain value and/or linearity value for each of the one or more intermediate frequency stage circuitries at given frequencies (e.g., 2.4 GHz) may be stored in memory and referenced when the one or more receivers are operational.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mm Wave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
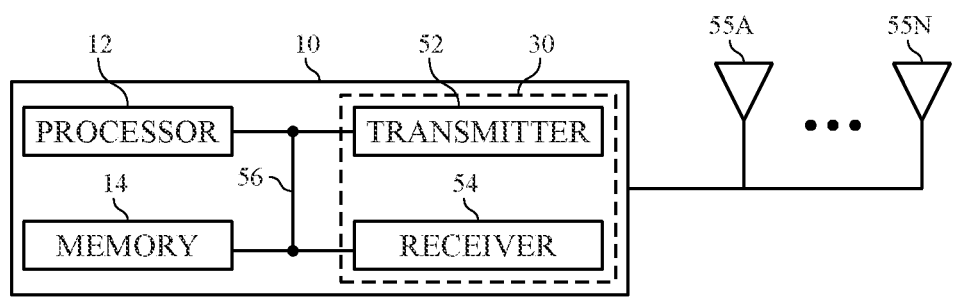
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
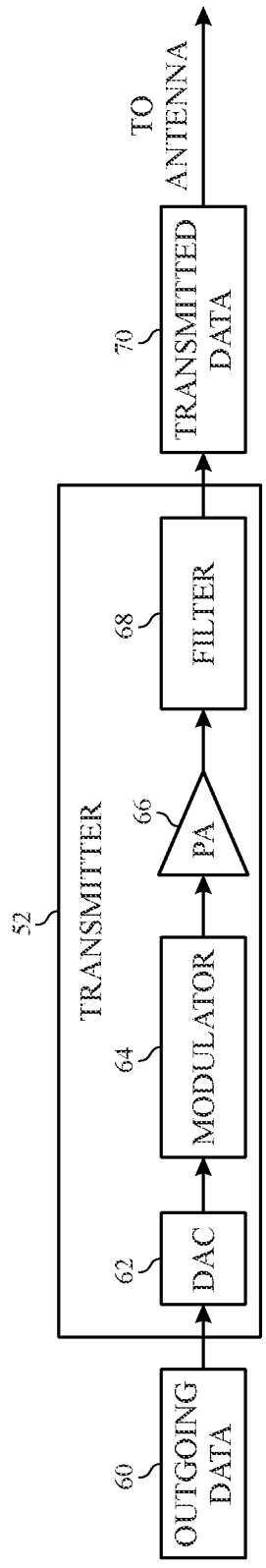
FIG. 3 is a schematic diagram of a transmitter of the electronic device of FIG. 1, according to embodiments of the present disclosure.

As mentioned above, the transceiver 30 of the electronic device 10 may include a transmitter and a receiver that are coupled to at least one antenna to enable the electronic device 10 to transmit and receive wireless signals. FIG. 3 is a block diagram of a transmitter 52 (e.g., transmit circuitry) that may be part of the transceiver 30, according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to increase a baseband frequency of the converted analog signal to a radio frequency. A power amplifier (PA) 67 receives the radio frequency signal from the modulator 64, and may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include one or more mixers and/or digital up-converters (e.g., that facilitate converting a signal having a baseband frequency to one having a radio frequency). As another example, the transmitter 52 may not include the filter 68 if the power amplifier 67 outputs the amplified signal in or approximately in a desired frequency range (such that filtering of the amplified signal may be unnecessary).

Figure 4:
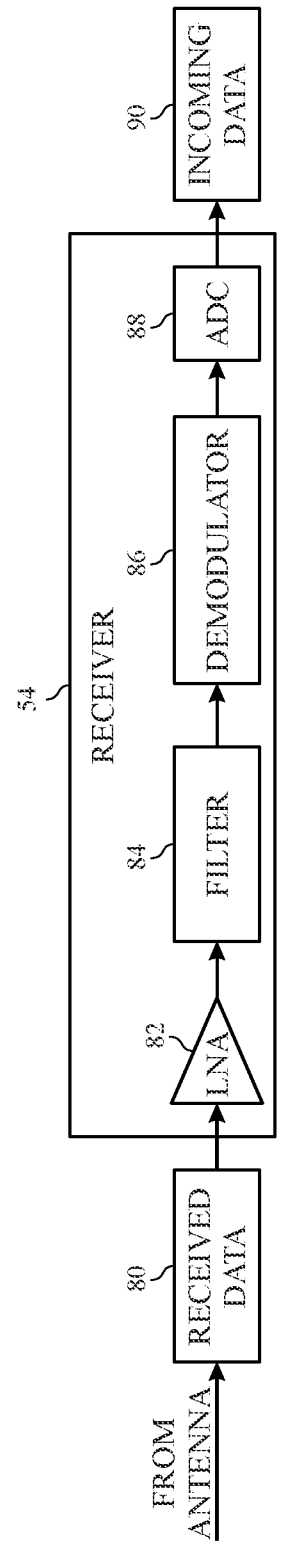
FIG. 4 is a schematic diagram of a receiver of the electronic device of FIG. 1, according to embodiments of the present disclosure.

FIG. 4 is a schematic diagram of a receiver 54 (e.g., receive circuitry) that may be part of the transceiver 30, according to embodiments of the present disclosure. As illustrated, the receiver 54 may receive received data 80 from the one or more antennas 55 in the form of an analog signal. A low noise amplifier (LNA) 81 may amplify the received analog signal to a suitable level for the receiver 54 to process. A filter 85 (e.g., filter circuitry and/or software) may remove undesired noise from the signal, such as cross-channel interference. The filter 85 may also remove additional signals received by the one or more antennas 55 that are at frequencies other than the desired signal. The filter 85 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include one or more mixers and/or digital downconverters (e.g., that facilitate converting an input signal having a radio frequency to a baseband frequency).

Figure 5:
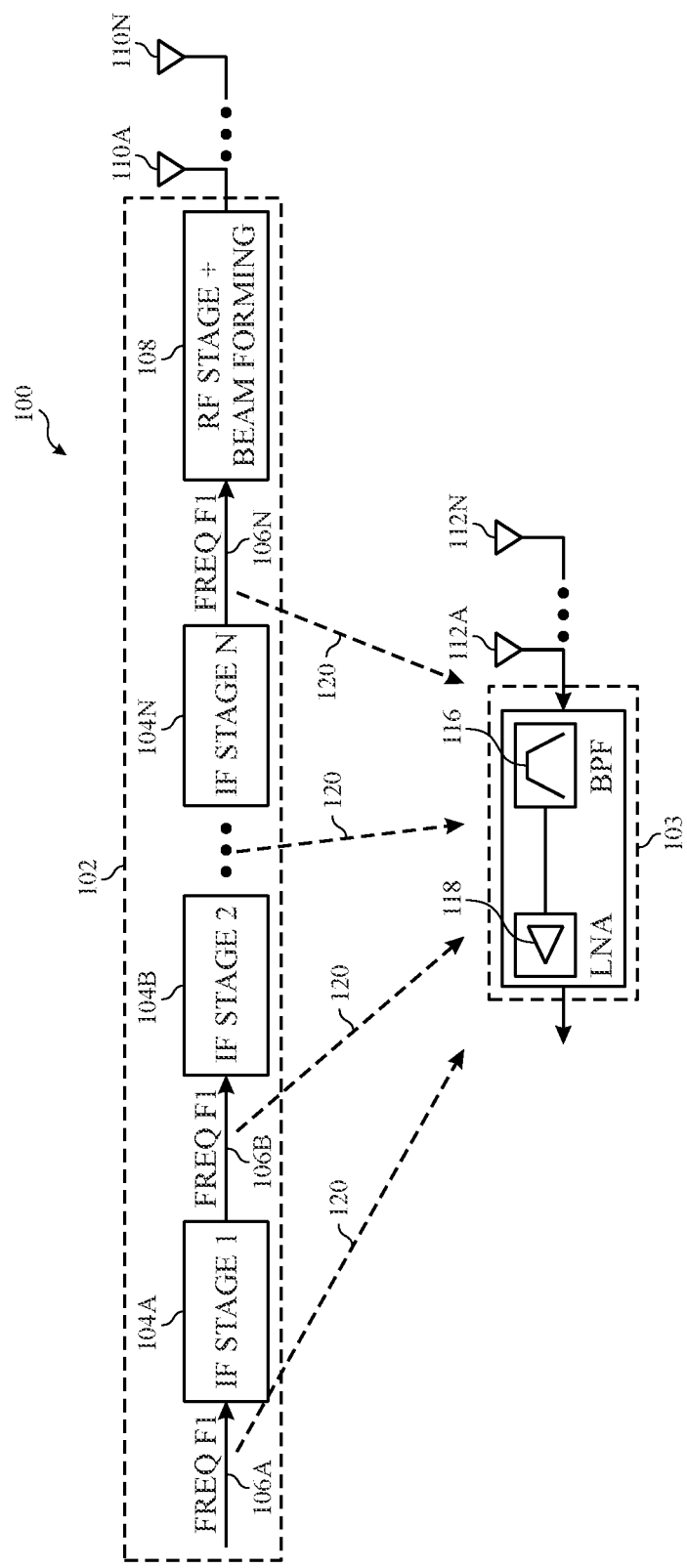
FIG. 5 illustrates a multi-radio system of the electronic device of FIG. 1, according to embodiments of the present disclosure.

With the foregoing in mind, FIG. 5 illustrates a multi-radio system 100 that may include portions of a transmitter 102 and a receiver 103, according to the embodiments of the present disclosure. For instance, the transmitter 102 may have similar components as the transmitter 52 in FIG. 3 and the receiver 103 may have similar components as the receiver 54 in FIG. 4. Furthermore, the transmitter 102 and the receiver 103 may be located in the same transceiver. In additional or alternative embodiments, the transmitter 102 and the receiver 103 may not be located in the same transceiver. In some embodiments, there may be more than one receiver 103 in the multi-radio system 100. The transmitter 102 may include one or more intermediate frequency stage circuitries 104 (illustrated as 104A-104N, collectively referred to as an intermediate frequency stage circuitry 104) (e.g., in a modulator 64). Each intermediate frequency stage circuitry 104 may convert an input signal having an input frequency to an output signal having a higher output frequency. As illustrated, a first intermediate frequency stage circuitry 104A may receive a signal with a first frequency 106A and convert the first frequency 106A to a higher output frequency 106B. Each intermediate frequency stage circuitry 104 may include one or more components (e.g., amplification circuitry) including a mixer, an amplifier, and/or a filter to up-convert the frequency of the input signal to generate the output signal.

Furthermore, the first intermediate frequency stage circuitry 104A may send the output signal with a second frequency 106B to a second intermediate frequency stage circuitry 104B. The second intermediate frequency stage circuitry 104B may convert the second frequency 106B to a higher output frequency and send the output signal to a next intermediate frequency stage circuitry. This may repeat with any suitable number of higher output frequencies and intermediate frequency stage circuitries, until a last higher output frequency 106N that is a desired radio frequency, converted by a final intermediate frequency stage circuitry 104N

The final intermediate frequency stage circuitry 104N may send the last output signal having the radio frequency 106N to beamforming and radio frequency (RF) output circuitry 108. The beamforming and RF output circuitry 108 may use a first set of antennas 110 (illustrated as 110A-110N, collectively referred to as a first set of antennas 110) to form a radio frequency beam using beam forming techniques.

The receiver 103 may receive an incoming signal via a second set of antennas 112 (illustrated as 112A-112N, collectively referred to as a second set of antennas 112). In some embodiments, the incoming signal may be sent from an external device. The receiver 103 may receive signals at a certain frequency or range of frequencies. The receiver 103 may include a bandpass filter 116, a low noise amplifier 118, and/or other processing circuitry (e.g., the demodulator 86, the ADC 88, the mixer 82, and/or the VCO 84), and thus may filter the received signal with the bandpass filter 116, amplify the received signal with the low noise amplifier 118, demodulate the received signal with the demodulator 86, and so on. The receiver 103 may send the signal to one or more components of the electronic device 10, such as the processor 12.

As discussed above, the receiver 103 in the multi-radio system 100 may operate on a specified frequency 106. One of the intermediate frequency stage circuitries 104 may operate on the same or overlap with the specified frequency 106 on which the receiver 103 is operating. This may lead to interference 120 between one of the intermediate frequency stage circuitries 104 and the receiver 103. By way of example, the receiver 103 may receive signals at 2.4 GHz. In some embodiments, the first intermediate frequency stage circuitry 104A may output signals with the same frequency of 2.4 GHz. This may cause the signals output by the first intermediate frequency stage circuitry 104A to interfere (e.g., introduce noise) with the received signals and/or the functionality of the receiver 103. This type of interference may be referred to as a "coupling" channel due to both the first intermediate frequency stage circuitry 104A and the receiver 103 operating on the frequency of 2.4 GHz.

In an additional example, the first intermediate frequency stage circuitry 104A may output signals with the frequency of 1.9 GHz. In some cases, the output signals may cause spurious emissions outside of the desired frequency, such as at 2.4 GHz, thus interfering with the received signals and/or the functionality of the receiver 103. This type of interference may be referred to as "out-of-band" interference. Each type of interference may lead to varying levels of interference (e.g., noise) into or around the frequency channel used by the receiver 103.

As stated above, the interference 120 (e.g., noise) introduced by the one or more intermediate frequency stage circuitries 104 may impact the functionality of the receiver 103, such as the sensitivity of the receiver 103. That is, interference 120 at or around the frequency operated on by each receiver 103 may impact the strength or quality of the received signal at the receiver 103. However, the interference 120 introduced by the one or more intermediate frequency stage circuitries 104 may be mitigated by modifying one or more operating characteristics of each intermediate frequency stage circuitry 104.

Figure 6:
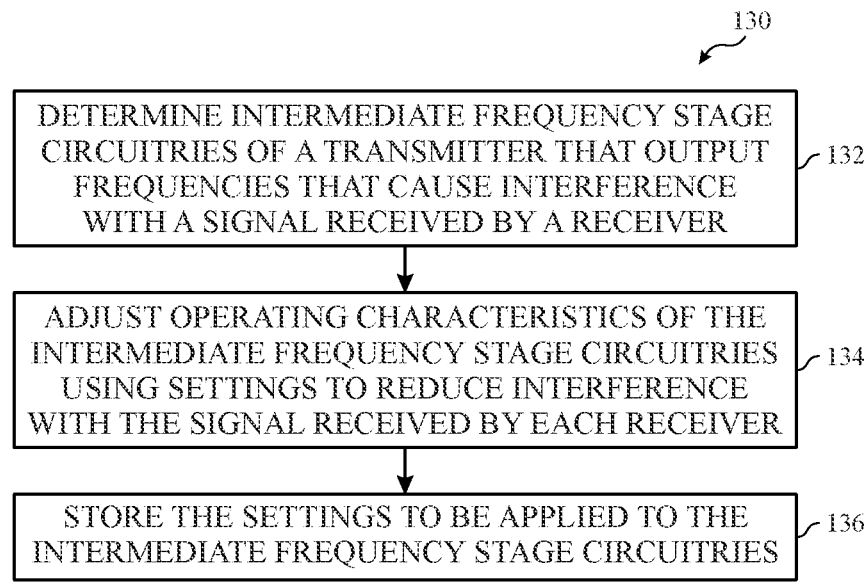
FIG. 6 is a flowchart of a method for determining one or more settings to apply to one or more intermediate frequency stage circuitries of the transmitter of FIG. 5 to mitigate interference on the receiver of FIG. 5, according to embodiments of the present disclosure.

With the foregoing in mind, FIG. 6 is a flowchart of a method 130 for determining one or more operating characteristics of the intermediate frequency stage circuitries 104 of the transmitter 102 to mitigate the impact of interference on the receiver 103, in accordance with the present embodiments. Any suitable component (e.g., a processor) that may control the components of the multi-radio system 100, such as the processor 12 of the electronic device 10, may perform the method 130. In some embodiments, the method 130 may be implemented by executing instructions stored in a tangible, non-transitory, computer-readable medium, such as the memory 14 or storage 16, using the processor 12. While the method 130 is described using steps in a specific sequence, it should be understood that the present disclosure contemplates that the described steps may be performed in different sequences than the sequence illustrated, and certain described steps may be skipped or not performed altogether.

At block 132, the processor 12 may select or determine one or more intermediate frequency stage circuitries 104 of the transmitter 102 of the electronic device that output one or more frequencies 106 that cause interference with a signal received by the receiver 103 of the electronic device. The memory 14 and/or the storage 16 may store (e.g., in a table) the predetermined frequencies 106 output by the intermediate frequency stage circuitries 104, as well as frequencies that spurious emissions caused by the intermediate frequency stage circuitries 104. The frequency 106 output by each intermediate frequency stage circuitry 104 may be compared to the frequency 106 that each receiver 103 in the multi-radio system 100 is configured to receive to determine which signals output by the one or more intermediate frequency stage circuitries 104 of the transmitter 102 may cause the interference 120.

At block 134, the processor 12 may adjust one or more operating characteristics of the one or more intermediate frequency stage circuitries 104 using one or more settings to reduce interference with the signal received by each receiver 103. The one or more settings may include values for modifying the one or more operating characteristics, which may include a gain value and/or linearity for each intermediate frequency stage circuitry 104 of the transmitter 102. That is, each intermediate frequency stage circuitry 104 may convert an input signal having an input frequency to an output signal having a higher output frequency by amplifying the signal based upon a gain value. The gain value may indicate the increase of amplitude that the signal experiences as it passes through a respective intermediate frequency stage circuitry 104, and may be expressed in decibels (dB). Additionally, the processor 12 may improve the linearity of the one or more components (e.g., amplification circuitry) of each intermediate frequency stage circuitry 104. As discussed above, the linearity may refer to the ability of the amplification circuitry to produce an output signal that resembles the input signal. For example, the processor 12 may adjust a bias voltage provided to an amplification circuitry to modify the linearity of the amplification circuit. It should be noted that the processor 12 may adjust any other suitable settings that may modify other operating characteristics of each intermediate frequency stage circuitry 104 to reduce interference with received signals.

By reducing the gain value of the respective intermediate frequency stage circuitry 104, the noise resulting in a received signal may be reduced. Advantageously, the reduced gain value in a first intermediate frequency stage circuitry 104 may be compensated for by increasing the gain value in another intermediate frequency stage circuitry 104. By way of example, when the first intermediate frequency stage circuitry 104A is interfering with a respective receiver 103, the gain value of the first intermediate frequency stage circuitry 104A may be reduced. To compensate, the gain value of the second intermediate frequency stage circuitry 104B may be increased. It should be noted that the gain value of any of the one or more intermediate frequency stage circuitry 104 may be modified to compensate for the reduced gain value in another one or more intermediate frequency stage circuitry 104.

Furthermore, the linearity of each intermediate frequency stage circuitry 104 may be increased to reduce the spurious noise spectrum at the output of each intermediate frequency stage circuitry 104. To increase the linearity, the bias voltage supplied to the one or more components (e.g., amplifier, mixer, and/or filter) of each intermediate frequency stage circuitry 104 may be increased.

To determine the one or more settings including values for the one or more operating characteristics to reduce interference, each receiver 103 in the multi-radio system 100 and the transmitter 102 may be operated concurrently or simultaneously. For example, in the case of multiple receivers 103, for each receiver 103 and/or each combination of receivers 103, a set of settings (e.g., one or more settings) to apply to the transmitter 102 may be determined. Each set of settings may be determined by determining a level of interference experienced by a respective receiver 103 and modifying the set of settings (e.g., causing changes in the one or more operating characteristics of the transmitter 102) until a signal-to-noise ratio of the received signal is below a threshold. The threshold may be predetermined based on an amount of noise acceptable for each receiver 103 to receive a signal accurately (e.g., with sufficient signal power and/or quality). The one or more settings may specifically affect the gain values and/or linearity for each intermediate frequency stage circuitry 104 when each receiver 103 is operational. It should be noted that when a respective receiver 103 is operational, the processor 12 may apply the one or more settings to the transmitter 102. In some embodiments, the processor 12 may determine updated sets of the one or more settings manually or periodically (e.g., weekly, monthly, bi-monthly, yearly, and so on).

At block 136, the processor 12 may store the one or more settings to be applied to the one or more intermediate frequency stage circuitries 104. The processor 12 may store the one or more settings in any suitable data structure that may be accessible during operation of the multi-radio system 100 (e.g., the memory 14 and/or the storage 16). In this manner, the method 130 may enable the processor 12 to generate settings to apply to the transmitter 102 to reduce interference with the receiver 103.

The one or more intermediate frequency stage circuitries 104 of the transmitter 102 may transmit signals using high performance settings when there are no receivers 103 operating on the frequencies output by the one or more intermediate frequency circuitries 104 or spurious emissions generated by the one or more intermediate frequency circuitries 104 of the transmitter 102. That is, an additional set of settings when the transmitter 102 is free to transmit without generating interference 120 with the receiver 103 may be determined in addition those generated by the method 130. These may be referred to as "high performance" settings, as the transmitter 102 is free to use an increased or maximum transmission power, as the transmitted signals may not generate interference 120 with the receiver 103.

Figure 7:
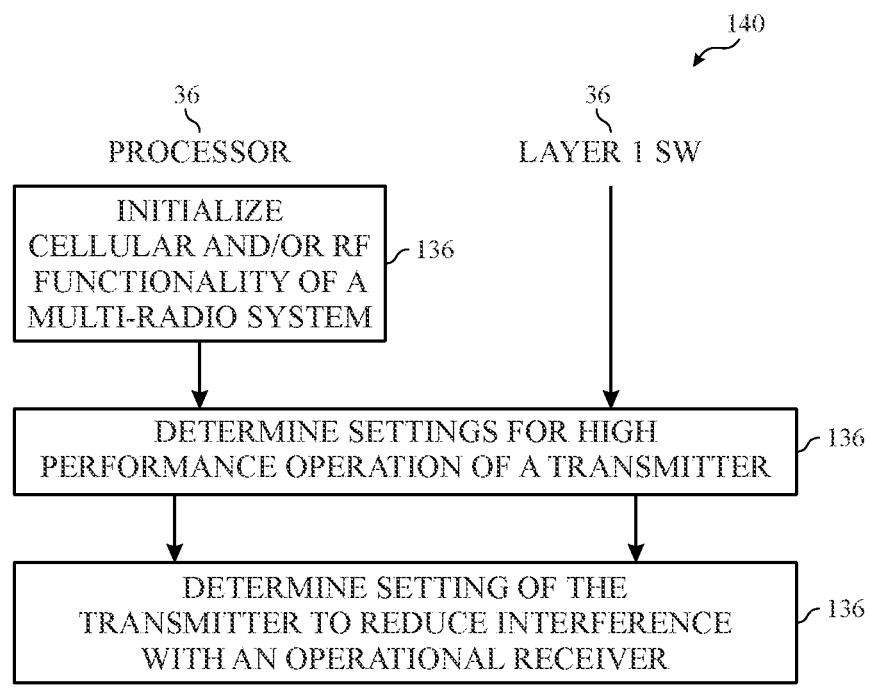
FIG. 7 is a flowchart of a method for determining a set of transmitter settings for high performance operation and a set of transmitter settings for operational receivers, according to embodiments of the present disclosure.

With the foregoing in mind, FIG. 7 is a flowchart of a method 140 for determining the one or more settings of the transmitter 102 during operation with and without operational receivers 103, in accordance with the current embodiments. For example, the method 140 may be performed during an initial testing of the electronic device 10 (e.g., at a manufacturing facility, in a testing environment, and so on). Any suitable component (e.g., a processor) that may control the components of the multi-radio system 100, such as the processor 12 of the electronic device 10, may perform the method 140. In some embodiments, the method 140 may be implemented by executing instructions stored in a tangible, non-transitory, computer-readable medium, such as the memory 14 or storage 16, using the processor 12. While the method 140 is described using steps in a specific sequence, it should be understood that the present disclosure contemplates that the described steps may be performed in different sequences than the sequence illustrated, and certain described steps may be skipped or not performed altogether.

At block 142, the processor 12 may initialize cellular and/or RF functionality of the multi-radio system 100. The processor 12 may receive an indication requesting the cellular and/or RF functionality from an application running on the electronic device 10. At block 144, the processor 12 and/or a first network layer software 141 may determine the one or more settings for high performance operation of the transmitter 102. The first network layer may include one or more components of the electronic device 10 that may transmit, receive, and modify signals (e.g., at least some portions of the transceiver 30, the transmitter 102, the receiver 103, the processor 12, and so on). The first network layer software 141 may load settings (e.g., determined by the processor 12), such as for high performance operation of the transmitter 102, that correspond to pin layouts, voltages, impedances, cable specifications, signal timing, and/or frequency of the one or more components of the first network layer. These settings may be stored in memory (e.g., the memory 14, the storage 16, and so on) and may be loaded at subsequent times (e.g., during consumer runtime) by the first network layer software 141 to operate the transmitter 102 at high performance.

The high performance operation may refer to when the transmitter 102 is functioning without generating interference with the receiver 103 of the multi-radio system 100. In some embodiments, the high performance operation may be performed when no receivers 103 are operational in the multi-radio system 100. In other embodiments, the high performance operation may be performed when operation of the transmitter 102 does not interfere with the operational receiver 103. That is, the operation of the transmitter 102 may not interfere with the operational receiver 103 when the signals transmitted by the transmitter 102 and/or spurious emissions resulting from the transmitter signals have frequencies that are not the same as and/or do not overlap with the frequencies of the operational receiver 103.

At block 146, the processor 12 and/or the first network layer software 141 may determine the one or more settings of the transmitter 102 to reduce interference with the operational receiver 103. As discussed above, for the receiver 103, the set of settings for modifying the one or more operating characteristics of each intermediate frequency stage circuitry 104 of the transmitter 102 may be determined by determining the level of interference experienced by the operational receiver 103 and modifying the one or more settings until the interference experienced by the operational receiver 103 is greater than the signal-to-noise ratio threshold. In this manner, the method 140 may enable the processor 12 and/or the first network layer software 141 to determine the one or more settings for high performance of the transmitter 102 and/or operation with receiver 103 of the multi-radio system 100.

Figure 8:
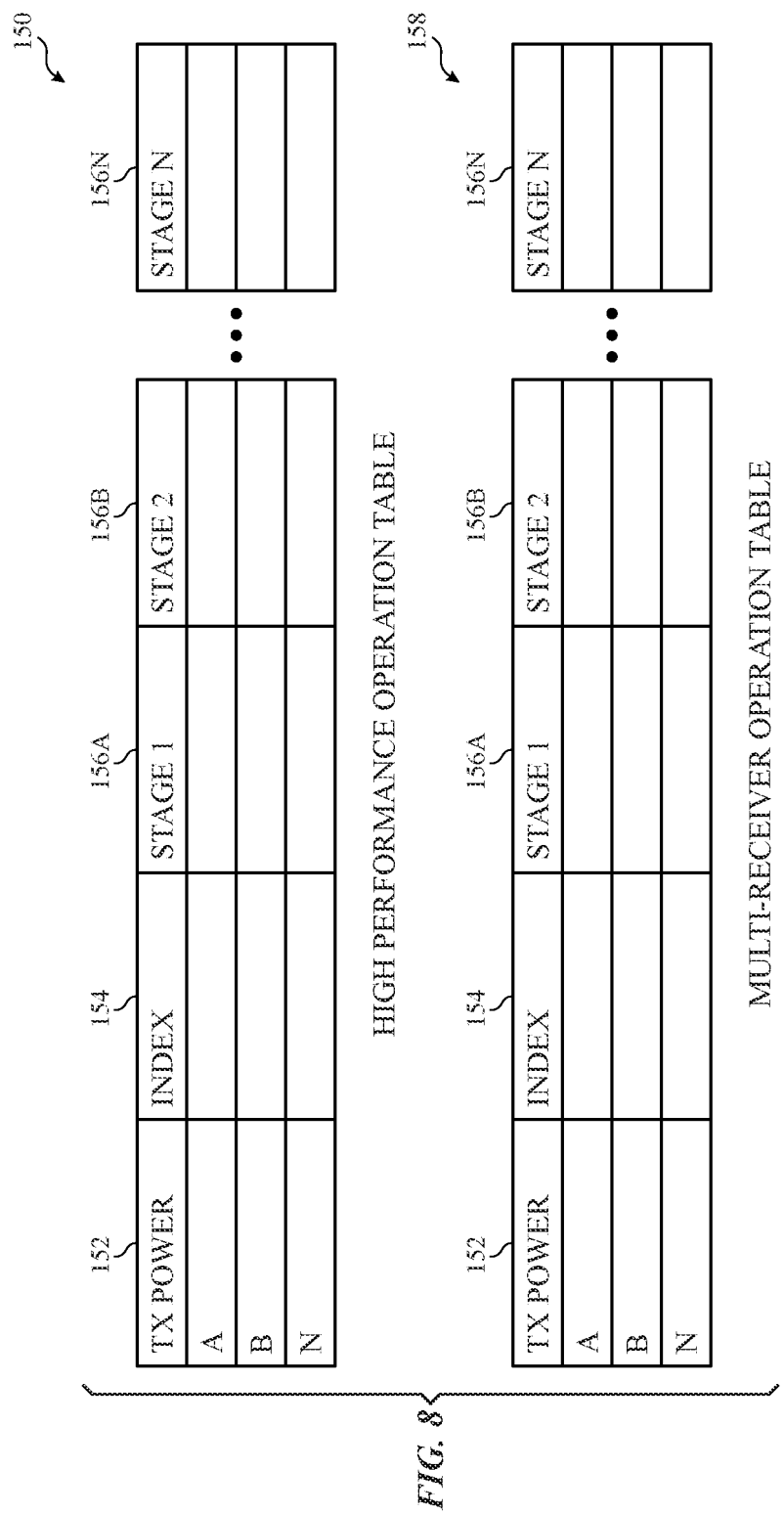
FIG. 8 illustrates a table of transmitter settings for high performance operation and a table of transmitter settings for operational receivers, according to embodiments of the present disclosure.

As discussed above, the one or more settings may be stored in any suitable memory 14 or storage 16 in the electronic device 10. With the foregoing in mind, FIG. 8 illustrates a table of a high performance operation settings 150 and a table of a multi-receiver operation settings 158. The high performance operation settings 150 and the multi-receiver operation settings 158 may be stored in any suitable storage location (e.g., the memory 14, the storage 16) in the electronic device 10. The high performance operation settings 150 may correspond to settings of the transmitter 102 and/or the intermediate frequency stage circuitries 104 that cause high performance operation (e.g., when transmissions do not cause interference with the receiver 103). The table of the high performance operation settings 150 may include one or more columns, including a transmitter power column 152, an index column 154, and/or one or more intermediate frequency stage circuitry columns 156 (illustrated as 156A-156N, collectively referred to as an intermediate frequency stage circuitry columns 156).

The transmitter power column 152 may include each power value supplied to the transmitter 102. It should be noted that each power value may be set by the processor 12 based on the signal transmitted by the transmitter 102. The index column 154 may include indexes associating the transmitter power 152 with settings of the intermediate frequency stage circuitries 104 that may be implemented by the multi-radio system 100. That is, each index value may be associated with a desired transmitter power value listed in the transmitter power column 152. The one or more intermediate frequency stage circuitry columns 156 may include the one or more settings determined in the method 140. That is, each intermediate frequency stage circuitry column 156 may include settings that cause the gain value, the bias voltage corresponding to the desired linearity, and/or any other values associated with noise-generating aspects of each intermediate frequency stage circuitry 104.

The multi-receiver operation settings 158 may correspond to settings of the transmitter 102 and/or the intermediate frequency stage circuitries 104 that are used when one or more receiver(s) 103 are operational. As such, the multi-receiver operation settings 158 may be applied when the electronic device 10 is operating in a coexistence mode (e.g., when the transmitter 102 and the receiver 103 both operate and may "coexist" with one another). As such, the multi-receiver operation settings 158 may also be referred to as coexistence settings. The multi-receiver operation settings 158 may include one or more columns, including the transmitter power column 152, the index column 154, and/or the one or more intermediate frequency stage circuitry columns. As described above, the transmitter power column 152 may include power values supplied to the transmitter 102. The index column 154 may include indexes associating the transmitter power 152 with settings of the intermediate frequency stage circuitries 104 that may be implemented by the multi-radio system 100. That is, each index value may be associated with the desired transmitter power value listed in the transmitter power column 152. The intermediate frequency stage circuitry columns 156 may include the one or more settings determined in the method 140. That is, each intermediate frequency stage circuitry column 156 may include settings that cause the gain value, the bias voltage corresponding to the desired linearity, and/or any other values associated with noise-generating aspects of each intermediate frequency stage circuitry 104.

Figure 9:
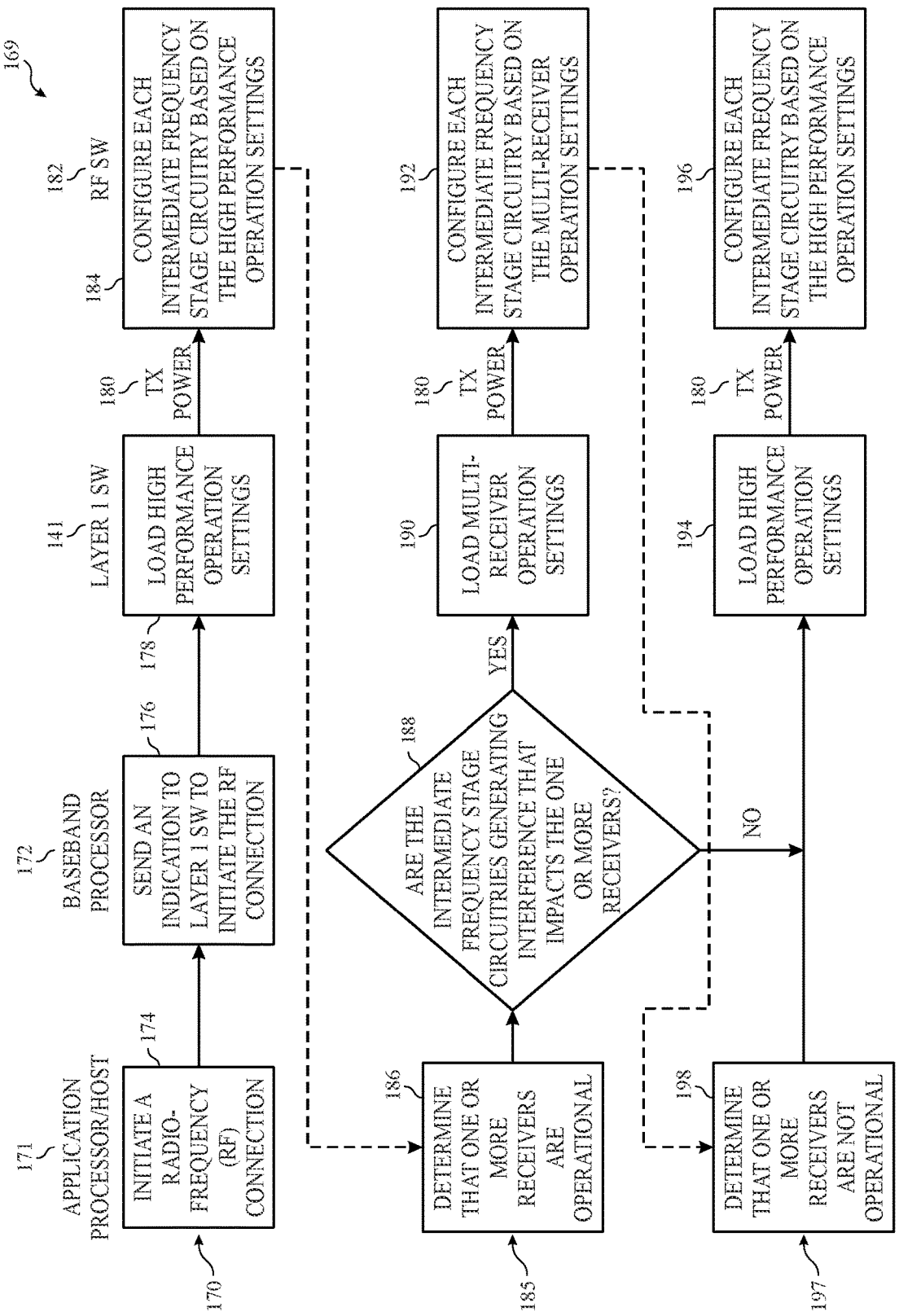
FIG. 9 is a flowchart of a method for operating the multi-radio system of FIG. 5, according to embodiments of the present disclosure.

With the foregoing in mind, FIG. 9 is a flowchart of a method 169 for operating the multi-radio system 100, in accordance with the current embodiments. Any suitable component (e.g., a processor) that may control the components of the electronic device 10 and/or the multi-radio system 100, such as the processor 12, may perform the method 169. In some embodiments, the method 169 may be implemented by executing instructions stored in a tangible, non-transitory, computer-readable medium, such as the memory 14 or storage 16, using the processor 12. While the method 169 is described using steps in a specific sequence, it should be understood that the present disclosure contemplates that the described steps may be performed in different sequences than the sequence illustrated, and certain described steps may be skipped or not performed altogether.

In some embodiments, an application processor/host 171 may perform a first set of blocks 170 (174, 176, 178, 184) when starting a cellular connection. In particular, at block 174, the application processor/host 171 (which may be part of the processing circuitry 12) may initiate a radio-frequency (RF) connection and send a command to a baseband processor 172 (which may also be part of the processing circuitry 12) to initiate the RF connection. The RF connection may include a 5G connection, such as within the millimeter wave (mmWave) frequency range (e.g., 24.25-300 gigahertz (GHz)). The application processor/host 171 may manage software applications executing on the electronic device 10 and provide system resources to the applications. As such, in some cases, an application may request RF functionality of the electronic device 10 (e.g., a messaging application, an internet application, and/or any application that uses RF functionality), and the application processor/host 171 may provide the functionality through the baseband processor 172. The baseband processor 172 may manage radio functions of the electronic device 10, including operating the transmitter 102 and the receiver 103.

At block 176, the baseband processor 172 may send an indication to the first network layer software 141 to initiate the RF connection. At block 178, the first network layer software 141 may load the high performance operational settings 150. That is, the first network layer software 141 may retrieve and load the high performance operational settings 150 (e.g., from the memory 14, the storage 16, or any suitable storage location). For example, the first network layer software 141 may determine a transmitter power value 180 corresponding to high performance transmission and determine an index value from the transmitter power column 152. The first network layer software 141 may then transmit the transmitter power value 180 to RF software (SW) 182. The RF software 182 may configure operating characteristics of RF hardware (HW) of the electronic device 10 (e.g., the transmitter 102, the receiver 103, and/or other components of the multi-radio system 100). The RF software 182 may retrieve the index value 154 associated with the transmitter power value 180 from the high performance operation settings 150, and use the index value 154 to retrieve the one or more settings 156 of the intermediate frequency stage circuitries 104 of the transmitter 102. At block 184, the RF software 182 may configure each intermediate frequency stage circuitry 104 (e.g., RF hardware) in the transmitter 102 in the multi-radio system 100 based on the one or more retrieved settings 156 of the intermediate frequency stage circuitries 104 from the high performance operation settings 150 (e.g., prior to operation of the receiver 103). It should be noted that the first network layer software 141 and/or the RF software 182 may be executed by the processing circuitry 12 (e.g., including the application processor 171 and/or the baseband processor 172).

In some embodiments, the baseband processor 172 may determine an operational mode of the receiver 103. That is, the baseband processor 172 may determine whether the receiver 103 is in a first operational mode, where the first operational mode is associated with the receiver 103 being operational. In some embodiments, the first operational mode may be associated with the receiver 103 operating on a frequency that overlaps with that of one or more frequencies 106 of the output signals of the one or more intermediate frequency stage circuitries 104. In additional or alternative embodiments, the first operational mode may be associated with the receiver 103 operating on a frequency that overlaps with that of a spurious emission generated by the output signals of the one or more intermediate frequency stage circuitries 104.

Furthermore, the baseband processor 172 may also indicate whether the receiver is in a second operational mode, where the second operational mode is associated with the receiver being not operational. In some embodiments, the second operational mode may be associated with the receiver 103 operating on a frequency that does not overlap with that of one or more frequencies 106 of the output signals of the one or more intermediate frequency stage circuitries 104. In additional or alternative embodiments, the second operational mode may be associated with the receiver 103 operating on a frequency that does not overlap with that of a spurious emission generated by the output signals of the one or more intermediate frequency stage circuitries 104. The baseband processor 172 may send the indication of the operational mode of the receiver 103 to the first network layer software 141 and the RF software 182.

That is, in some embodiments, the application processor/host 171 may perform a second set of blocks 185 (186, 188, 190, 192, 194, 196) when it determines that the receiver 103 (e.g., of a radio different than that of the transmitter 102) is operational. As such, the electronic device 10 may be operating in a coexistence mode, such that multiple radios (e.g., including the transmitter 102 and the receiver 103) of the multi-radio system 100 are in operation. As such, in such embodiments, the application processor/host 171 may proceed from block 184 to block 186, in which the baseband processor 172 may determine that the receiver 103 is operational. That is, the application processor/host 171 may determine which receivers 103 are to be operated based upon the initiated RF connection. In some embodiments, the baseband processor 172 may determine that the receiver 103 is operational based upon the command received from the application processor/host 171.

At block 188, the baseband processor 172 may determine if the one or more intermediate frequency stage circuitries 104 are generating interference that impacts the receiver 103. Generated interference that impacts the receiver 103 may be determined based on the frequency overlap of the transmitter signals and/or the spurious emissions generated by the transmitting of the transmitter signals. In some embodiments, the baseband processor 172 may determine if the generated interference impacts the receiver 103 based on a frequency plan of the transmitter 102. If the baseband processor 172 determines that the one or more intermediate frequency stage circuitries 104 are generating interference that impacts the receiver 103, then, at block 190, the first network layer software 141 may load the multi-receiver operation settings 158.

That is, the first network layer software 141 may retrieve and load the multi-receiver operation settings 158 (e.g., from the memory 14, the storage 16, or any suitable storage location). For example, the first network layer software 141 may determine a transmitter power value 180 corresponding to transmission when one or more receivers 103 are operational and determine the index value from the transmitter power column 152. The first network layer software 141 may then transmit the transmitter power value 180 to the RF software (SW) 182. The RF software 182 may retrieve the index value 154 associated with the transmitter power value 180 from the multi-receiver operation settings 158, and use the index value 154 to retrieve the one or more settings 156 of the intermediate frequency stage circuitries 104 of the transmitter 102. At block 192, the RF software 182 may configure each intermediate frequency stage circuitry 104 (e.g., RF hardware) in the transmitter 102 in the multi-radio system 100 based on the one or more retrieved settings 156 of the intermediate frequency stage circuitries 104 from the multi-receiver operation settings 158.

If the baseband processor 172 determines that the one or more intermediate frequency stage circuitries 104 are not generating interference that impacts the receiver 103, then, at block 194, the first network layer software 141 may load the high performance operational settings 150. That is, the first network layer software 141 may retrieve and load the high performance operational settings 150 (e.g., from the memory 14, the storage 16, or any suitable storage location). For example, the first network layer software 141 may determine the transmitter power value 180 corresponding to high performance transmission and determine the index value from the transmitter power column 152. The first network layer software 141 may then transmit the transmitter power value 180 to the RF software (SW) 182. The RF software 182 may retrieve the index value 154 associated with the transmitter power value 180 from the high performance operation settings 150, and use the index value 154 to retrieve the one or more settings 156 of the intermediate frequency stage circuitries 104 of the transmitter 102. At block 196, the RF software 182 may configure each intermediate frequency stage circuitry 104 in the transmitter 102 in the multi-radio system 100 based on the one or more retrieved settings 156 of the intermediate frequency stage circuitries 104 from the high performance operation settings 150.

In some embodiments, the application processor/host 171 may perform a third set of blocks 197 (198, 194, 196) when it determines that the receiver 103 (e.g., of a radio different than that of the transmitter 102) is no longer operational. That is, the electronic device 10 may be exit from operating in the coexistence mode, such the transmitter 102 is in operation, but the receiver 103 is not. As such, in such embodiments, the application processor/host 171 may proceed from block 192 to block 198, in which the baseband processor 172 may determine that the receiver 103 is not operational in the multi-radio system 100. In some embodiments, at block 198, the baseband processor 172 may determine that the receiver 103 is operational, but that the frequency of the receiver 103 does not overlap with interference cause by the frequency of the transmitter signals and/or the spurious emission generated by the transmitter signals. The baseband processor 172 may follow a similar decision process to when the one or more intermediate frequency stage circuitries 104 are not generating interference that impacts the receiver 103. The first network layer software 141 may load the high performance operational settings 150. That is, the first network layer software 141 may retrieve and load the high performance operational settings 150 (e.g., from the memory 14, the storage 16, or any suitable storage location). For example, the first network layer software 141 may determine the transmitter power value 180 corresponding to high performance transmission and determine the index value from the transmitter power column 152. The first network layer software 141 may then transmit the transmitter power value 180 to the RF software (SW) 182. The RF software 182 may retrieve the index value 154 associated with the transmitter power value 180 from the high performance operation settings 150, and use the index value 154 to retrieve the one or more settings 156 of the intermediate frequency stage circuitries 104 of the transmitter 102. At block 196, the RF software 182 may configure each intermediate frequency stage circuitry 104 in the transmitter 102 in the multi-radio system 100 based on the one or more retrieved settings 156 of the intermediate frequency stage circuitries 104 from the high performance operation settings 150. In this manner, the method 169 may enable the electronic device 10, the processor 12, the first network layer software 141, and/or the RF software 182, to reduce interference when the signals transmitted by the transmitter 102 and/or spurious emissions resulting from the transmitter signals have frequencies that are the same as and/or overlap with the signals received by the receiver 103 in the multi-radio system 100.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
receiving a signal having a frequency at a receiver of an electronic device; and
adjusting, via a processor of the electronic device, one or more intermediate frequency stage circuitries of a transmitter of the electronic device based on the signal by
modifying a first gain level of a first intermediate frequency stage circuitry by a first amount, and
modifying a second gain level of a second intermediate frequency stage circuitry by a second amount, wherein the second amount is based on the first amount.

2. The method of claim 1, wherein adjusting, via the processor, the one or more intermediate frequency stage circuitries of the transmitter is performed based on the receiver being operational.

3. The method of claim 1, wherein the one or more intermediate frequency stage circuitries comprise one or more filters, one or more amplifiers, one or more mixers, or any combination thereof.

4. The method of claim 3, wherein the one or more intermediate frequency stage circuitries are associated with a gain level, a linearity, or both, of the one or more amplifiers.

5. The method of claim 4, wherein the linearity is indicative of an ability of a respective amplifier of the one or more amplifiers to produce an output signal that deviates from an input signal by less than a threshold amount.

6. The method of claim 1, wherein adjusting, via the processor, the one or more intermediate frequency stage circuitries comprises reducing the first gain level and increasing the second gain level.

7. The method of claim 1, wherein the one or more intermediate frequency stage circuitries are configured to output one or more signals comprising one or more frequencies that overlap with the frequency of the signal prior to adjusting the one or more intermediate frequency stage circuities, and adjusting, via the processor, the one or more intermediate frequency stage circuitries reduces interference between the one or more signals output by the one or more intermediate frequency stage circuitries and the signal received by the receiver.

8. The method of claim 1, comprising concurrently operating the transmitter and the receiver.

9. An electronic device, comprising:
a transceiver comprising a transmitter and one or more receivers, the transmitter comprising one or more intermediate frequency stages; and
processing circuitry coupled to the transceiver, the processing circuitry configured to
receive one or more performance settings indicative of respective transmission powers for one or more signals sent from the one or more intermediate frequency stages based on each of the one or more receivers being in a first operational mode,
receive one or more adjusted settings indicative of adjusted transmission powers for the one or more signals sent from the one or more intermediate frequency stages based on at least one of the one or more receivers being in a second operational mode, and
operate the transmitter based on the one or more adjusted settings and the one or more receivers being in the second operational mode, the second operational mode being configured to reduce an amount of interference between the transmitter and the one or more receivers of the transceiver.

10. The electronic device of claim 9, wherein the first operational mode is indicative of the one or more receivers not being operational, the one or more receivers receiving the signals at a frequency that does not overlap with one or more frequencies of the one or more signals from the one or more intermediate frequency stages of the transmitter, or both.

11. The electronic device of claim 9, wherein the second operational mode is indicative of the one or more receivers being operational, the one or more receivers receiving signals at a frequency that overlaps with one or more frequencies of the one or more signals from the one or more intermediate frequency stages of the transmitter, or both.

12. The electronic device of claim 9, wherein the one or more intermediate frequency stages comprise one or more filters, one or more amplifiers, one or more mixers, or any combination thereof.

13. The electronic device of claim 12, wherein the one or more adjusted settings are associated with one or more operational characteristics of the one or more intermediate frequency stages, the one or more operational characteristics comprising a gain level, a linearity, or both, of the one or more amplifiers.

14. The electronic device of claim 9, wherein the one or more adjusted settings are configured to reduce the amount of interference between signals received by the one or more receivers and one or more signals generated by the one or more intermediate frequency stages by reducing a first gain level of a first intermediate frequency stage and increasing a second gain level of a second intermediate frequency stage.

15. The electronic device of claim 14, wherein reducing the first gain level corresponds to a first adjustment, increasing the second gain level corresponds to a second adjustment, and the second adjustment at least partially compensates for the first adjustment.

16. The electronic device of claim 9, wherein the one or more performance settings are configured to increase a transmission power of one or more signals from the one or more intermediate frequency stages to a maximum transmission power.

17. One or more tangible, non-transitory, computer-readable media storing instructions executable by one or more processors of an electronic device, wherein the instructions cause the one or more processors to:
 operate a transmitter having one or more intermediate frequency stages using one or more high performance settings, the one or more high performance settings indicative of an increased or maximum transmission power for each of the one or more intermediate frequency stages;
 receive an indication that a receiver is operating on a frequency, the receiver and the transmitter being associated with a transceiver; and
 operate the transmitter using one or more adjusted settings in response to determining that a respective frequency of at least one intermediate frequency stage of the one or more intermediate frequency stages overlaps with the frequency of the receiver, the one or more adjusted settings being configured to reduce an amount of interference within the transceiver having the transmitter and the receiver.

18. The tangible, non-transitory, computer-readable media of claim 17, wherein the one or more adjusted settings are configured to reduce a gain level of a first intermediate frequency stage and increase a gain level of a second intermediate frequency stage.

19. The tangible, non-transitory, computer-readable media of claim 17, wherein the one or more adjusted settings are configured to adjust a linearity of the one or more intermediate frequency stages, the linearity being indicative of an ability of a respective intermediate frequency stage to produce an output signal that deviates from an input signal by less than a threshold amount.

20. The tangible, non-transitory, computer-readable media of claim 19, wherein the one or more intermediate frequency stages comprise one or more filters, one or more amplifiers, one or more mixers, or any combination thereof.

* * * * *